United States Patent
Boss et al.

(10) Patent No.: US 10,924,417 B2
(45) Date of Patent: Feb. 16, 2021

(54) COGNITIVE COMMUNICATION CHANNEL-ADAPTATION BASED ON CONTEXT

(71) Applicant: INTERNATIONAL BUSINESS MACHINES CORPORATION, Armonk, NY (US)

(72) Inventors: Gregory J. Boss, Saginaw, MI (US); Michael Bender, Rye Brook, NY (US); Shikhar Kwatra, Durham, NC (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 16/245,640

(22) Filed: Jan. 11, 2019

(65) Prior Publication Data
US 2020/0228452 A1    Jul. 16, 2020

(51) Int. Cl.
| | |
|---|---|
| H04L 12/28 | (2006.01) |
| H04L 12/851 | (2013.01) |
| H04L 29/08 | (2006.01) |
| H04L 12/24 | (2006.01) |
| G06N 20/10 | (2019.01) |
| H04B 17/309 | (2015.01) |

(52) U.S. Cl.
CPC ............ *H04L 47/24* (2013.01); *G06N 20/10* (2019.01); *H04B 17/309* (2015.01); *H04L 41/147* (2013.01); *H04L 67/22* (2013.01)

(58) Field of Classification Search
CPC .. H04L 25/0202; H04L 41/08; H04L 41/0813
USPC .......................................... 370/254, 255, 437
See application file for complete search history.

(56) References Cited

U.S. PATENT DOCUMENTS

| | | | | |
|---|---|---|---|---|
| 8,325,883 | B2 * | 12/2012 | Schultz ............. | H04M 3/42391 370/466 |
| 8,688,457 | B2 * | 4/2014 | Dewa ................... | G09B 21/009 345/163 |

(Continued)

FOREIGN PATENT DOCUMENTS

| | | |
|---|---|---|
| CN | 101291454 A | 10/2008 |
| CN | 101227647 A | 2/2012 |

OTHER PUBLICATIONS

P. Mell, et al. *"The NIST Definition of Cloud Computing"*, NIST Special Publication 800-145, Sep. 2011, Gaithersburg, MD.

*Primary Examiner* — Dmitry Levitan
(74) *Attorney, Agent, or Firm* — Brian Restauro, Esq.; George S. Blasiak, Esq.; Heslin Rothenberg Farley & Mesiti P.C.

(57) ABSTRACT

Methods, computer program products, and systems are presented. The methods include, for instance: predicting an upcoming communication content in a current channel based on learning input data from a plurality of sources relevant to a communication activity of a user. A user response to the predicted content is assessed and a communication channel model for the factors including the input data is selected. A user satisfaction level with the current channel is checked against a predefined threshold for the selected communication channel model. For the current channel that is less than satisfactory, an adaptive action is taken to adapt the current channel to another for the user.

20 Claims, 7 Drawing Sheets

(56) References Cited

U.S. PATENT DOCUMENTS

| | | | |
|---|---|---|---|
| 8,930,491 B2* | 1/2015 | Hardy | H04L 65/4076 |
| | | | 709/217 |
| 8,954,318 B2 | 2/2015 | Barve et al. | |
| 9,077,774 B2 | 7/2015 | Pikin et al. | |
| 9,113,208 B2* | 8/2015 | Belyaev | H04N 21/25841 |
| 9,277,004 B2* | 3/2016 | Padhye | H04L 67/101 |
| 10,009,437 B2* | 6/2018 | Erb | H04L 67/2823 |
| 10,466,978 B1* | 11/2019 | Vidan | G06N 20/00 |
| 2003/0234812 A1* | 12/2003 | Drucker | G06Q 10/10 |
| | | | 715/751 |
| 2007/0033250 A1 | 2/2007 | Levin et al. | |
| 2009/0193485 A1* | 7/2009 | Rieger | H04N 21/2385 |
| | | | 725/114 |
| 2011/0221901 A1* | 9/2011 | Bai | H04N 19/115 |
| | | | 348/148 |
| 2014/0259037 A1* | 9/2014 | Belyaev | H04N 21/44008 |
| | | | 725/14 |
| 2014/0259038 A1* | 9/2014 | Belyaev | H04N 21/4622 |
| | | | 725/14 |
| 2015/0020106 A1* | 1/2015 | Belyaev | H04N 21/458 |
| | | | 725/45 |
| 2015/0256677 A1 | 9/2015 | Konig et al. | |
| 2015/0365725 A1* | 12/2015 | Belyaev | H04N 21/8133 |
| | | | 725/46 |
| 2016/0381533 A1* | 12/2016 | Fogelson | H04L 51/066 |
| | | | 455/414.1 |
| 2017/0116883 A1* | 4/2017 | Wohlert | G09B 21/00 |
| 2019/0108353 A1* | 4/2019 | Sadeh | G06F 21/604 |

\* cited by examiner

US 10,924,417 B2

COGNITIVE COMMUNICATION CHANNEL-ADAPTATION BASED ON CONTEXT

TECHNICAL FIELD

The present disclosure relates to cognitive analytics technology, and more particularly to methods, computer program products, and systems for cognitively adapting a communication channel during an activity of a user.

BACKGROUND

Conventionally, communication services are fixed with a channel/medium through which a communication content is delivered. In modern telecommunication/media environment, users utilize communication services more often than ever, and consume unprecedented amount of media contents, and the rate grows rapidly more and more. As personal communication devices become more prevalent in usage, and made with more processing power and many types of highly effective user interfaces, all types of communication, including electronic communication, electronic media consumption, as well as in-person communication and day-to-day activities of people involving transfer and/or reception of certain messages, can benefit from the functionalities of modern technology.

SUMMARY

The shortcomings of the prior art are overcome, and additional advantages are provided, through the provision, in one aspect, of a method. The method includes, for instance: predicting, by one or more processor, an upcoming communication content in a current channel based on learning input data from a plurality of sources relevant to a communication activity of a user; assessing, by the one or more processor, a response of the user to the upcoming communication content from the predicting; selecting, by the one or more processor, one of communication channel models based on factors including the upcoming communication content from the predicting and the response of the user from the assessing; ascertaining, by the one or more processor, that the user response is less than satisfactory with the current channel based on a predefined threshold for the selected communication channel model; and adapting, by the one or more processor, the current channel to the user with another channel by performing an adaptive action corresponding to the communication channel model, where the user continues the communication activity by use of the another channel subsequent to the adapting.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
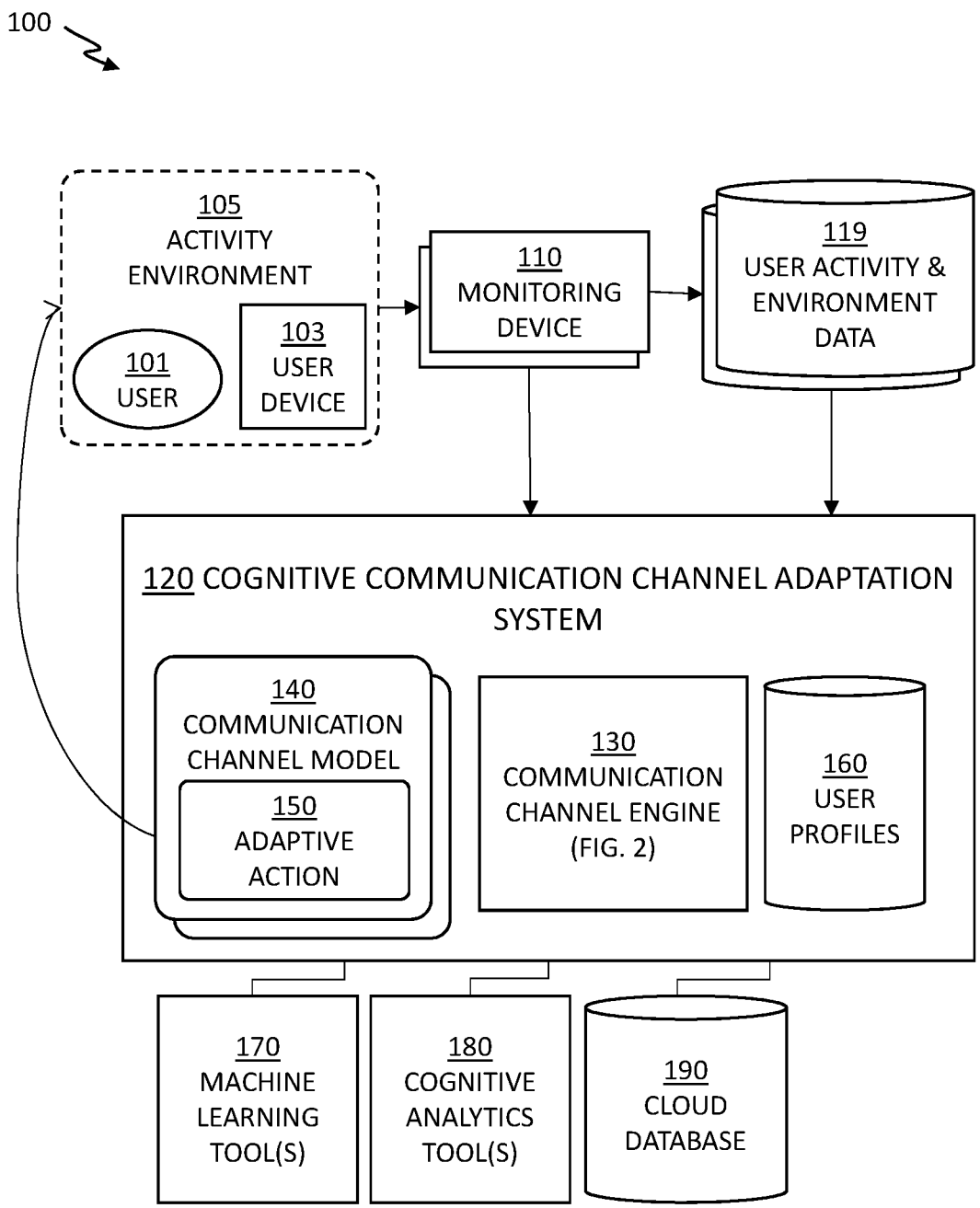
FIG. 1 depicts a system for a cognitive communication channel adaptation service, in accordance with one or more embodiments set forth herein.

FIG. 1 depicts a system 100 for a cognitive communication channel adaptation service, in accordance with one or more embodiments set forth herein.

The system 100 includes a cognitive communication channel adaptation system 120 that services a user 101. The user 101 accesses a user device 103 to receive the cognitive communication channel adaptation service. The user 101 is in an activity environment 105 and is being engaged in a certain user activity in which the user 101 performs a certain form of communication.

Examples of activities of the user 101 involving communication that are subject to the cognitive communication adaptation service include, but are not limited to, in-person conversations, phone conversations, video chats, watching television/Internet stream or any other activity consuming media products, attending seminar, going to movie, play, concert, and any other on-line or off-line activities, where the user 101 receives a message or sends a message via a communication channel.

Embodiments of the present invention recognize that communication occurs over a certain form of channel, also known as medium, between two or more participants sending and/or receiving a certain message. Embodiments of the present invention also recognize that a certain portion of population has difficulty in communicating in a certain way, and has a limitation communication capabilities such as hearing impairment, vision impairment, or any other kind of difficulty in receiving and/or understanding a particular type of message but are able to communicate in any other medium. For example, people with impaired vision have no difficulty understanding speech and respond by speech.

In this specification, the form of communication can be any combination of one-to-one communication as in a personal phone call, one-to-many communication as in a mass communication, broadcast, many-to-many communication as in a group teleconference, over an analog channel as in an in-person conversation, or a digital channel as in a telecommunication. The cognitive communication channel adaptation service as provided in the system 100 of FIG. 1 intends to improve any inconveniences or deficiencies with a currently used communication channel for the user 101 by adapting to another, more efficient communication channel than the previous channel without hindering an activity performed by the user 101. Accordingly, the user 101 continues the same activity but with the more efficient communication channel by use of the cognitive communication channel adaptation service.

In this specification, the user 101 is referred to as being engaged in an activity rather than performing a communication, as most of activities within the scope of this specification includes some type of communication, and a communication often occur in the context of other activities. For example, provided the user 101 who has a mild hearing impairment attends an outdoor music festival, the user 101 can hear very well from one location and the user 101 cannot hear much from another location because the impaired hearing of the user 101 is particularly susceptible with the placements of speakers. In the context of the cognitive communication channel adaptation service, the user 101 listening to music at the festival is a form of communication, and the cognitive communication channel adaptation service would take any adaptive action, if available, to improve delivery of the music to the user 101 in the context of the impaired hearing.

The cognitive communication channel adaptation system 120 includes a communication channel engine 130, a plurality of communication channel models 140, and user profiles 160.

The cognitive communication channel adaptation system 120 is operatively coupled to one or more machine learning tool 170, one or more cognitive analytics tool 180, and a cloud database 190. The communication channel engine 130 utilizes the machine learning tool 170 in training the communication channel models 140 based on the input data based on use cases, such that the communication channel models 140 would be effective in providing the cognitive communication channel adaptation services for the user 101. The communication channel engine 130 utilizes the cognitive analytics tool 180 in making predictions on progresses of a user activity, a user response and/or feedback with a certain communication channel, and/or a cognitive state of the user 101 while being engaged in the current activity, based on the input data as analyzed by the machine learning tool 170. Further, the cognitive communication channel adaptation system 120 is operatively coupled to natural language processing tools, including but not limited to, a text-to-speech tool and a speech-to-text tool to convert communication content in one channel to another channel, and a natural language analysis tool to processing the input data, including comments made by user.

The communication channel engine 130 predicts an upcoming communication content and a communication channel by which the communication content is delivered, based on input data from available data sources including the activity environment 105, the user profile 160, and the cloud database 190. The communication channel engine 130 subsequently assesses a response by the user 101 to the predicted communication content delivered by way of the communication channel. The communication channel engine 130, based on the predicted communication content and channel, the user response, and other relevant input data, subsequently selects a communication channel model 140 that is applicable for a current activity of the user 101. The communication channel engine 130 measures the level of satisfaction with the current communication channel by monitoring the user 101 while the user 101 continues the current activity. If the current communication channel is less than satisfactory for the user 101 with the current activity as defined in preconfigure thresholds, the communication channel engine 130 takes one of the adaptive action 150 corresponding to the communication channel model 140, such that the user 101 continues the current activity while communicating over a more effective communication channel as specified in the adaptive action 150. Detailed operations of the communication channel engine 130 are presented in FIGS. 2 and 3 and respectively corresponding descriptions.

Each of the communication channel models 140 of the cognitive communication channel adaptation system 120 includes one or more adaptive action 150. The communication channel model 140 correlates certain circumstances of user activity, as represented in various input data, and respective communication channel options applicable for the context represented in the input data. The communication channel model 140 includes one or more adaptive action 150 that can be taken to improve the efficiency of a communication channel that is current in the communication channel model 140. The communication channel engine 130 trains the communication channel models 140 over time based on the input data and feedbacks from the user 101 with respect to the performance of the cognitive communication channel adaptation service.

Few examples of the adaptive action 150 include, but are not limited to: changing the message format from audio message to video message, text, or any other visual message; enhancing visual message with subtitles and/or removing existing subtitles from visual message; changing current message format to a sign language format provided that the user 101 understands the sign language as described in the user profile 160; rephrasing speeches/texts with a level of vocabulary easily understood for the user by use of the natural language tool; switching from a speakerphone mode of a phone conversation to a text display on the user device or turning off the speaker on the phone and redirecting incoming audio message to the receiver only when the communication content is indicated to be confidential during the conversation; and converting any messages that is being delivered to the user in low quality through open air, in a crowded space, in a noisy environment, other otherwise where the user 101 experiences any interference in receiving the message would be collected, amplified, and delivered to the user device 103 in a channel preferred by the user 101 for an improved reception. Examples of the user device 103 include, but are not limited to, a mobile device with interface functionalities of an audio recorder/player, a speaker, a video/still image camera/player thereof, and a text messenger, with an access to a communication network in sending and receiving digital data, and any application utilizes and supports similar communication functionalities such as smart phones, wearable personal devices such as smart watches, smart glasses, and any other type of portable device that provides the aforementioned communication functionalities.

In certain embodiments of the present invention, the communication channel models 140 are generated and trained by the communication channel engine 130 while processing the input data by respective machine learning models, optionally based on respective priorities and/or weights with respect to relative contribution of each input data type to the predicting the upcoming communication content and a communication channel by which the communication content is being delivered.

In certain embodiments of the present invention, the communication channel models 140 are selected by the communication channel engine 130 based on specific values of the time of the user activity and the activity environment. For example, the communication channel engine 130 can determine that the user 101 is communicating over a mobile phone with a second user who is sitting in an airplane that is about to take off. The user device 103 for both users are respective smartphones or any other device having audio message recording and replay functionalities. The communication channel engine 130 can switch the communication channel model from an interactive phone conversation model to a delayed, asynchronous message delivery model based on availability, once the airplane of the second user takes off and the phone call is interrupted, and records the speech on respective user devices and plays the recorded message on the user device of other user.

In certain embodiments of the present invention, the communication channel models 140 can be modeled by use of a machine learning type of the support vector machine (SVM), such that the communication channel models 140 can be more easily reconstructed based on communication channels more suitable for the user 101 and/or more preferred by the user 101.

The user profile 160 includes communication capabilities of the user 101 as provided by the user 101 upon subscribing the cognitive communication adaptation service. Particularly, when the user 101 has any difficulty in communicating with a certain medium, such medium/channel the user 101 would have difficulty with, and accordingly, not recommended for the user 101, would be noted in the user profile 160, as well as any particular medium/channel the user 101 prefers. For example, if the user 101 is dyslexic, the user 101 would make a note in the user profile 160 to convert text messages, or any other printed material that the user 101 wishes to know, to audio stream for the user 101 so that the user 101 can understand the content with ease. Similarly, if the user 101 has impaired hearing or for any other reason prefers visual content without audio stream, the user 101 can indicate that in the user profile such that the cognitive communication channel adaptation service would provide all incoming audio messages as visual content that is equivalent to the any audio message. Examples of visual content for audio messages include, but are not limited to, subtitles on a video content, text balloons and text window on a video conference application, tickers and closed caption texts for broadcast shows, or a picture in picture display of sign language interpretations for speeches, provided that the user 101 can understand the sign language and prefers the sign language over text presentations.

The user profile 160 also includes authorization by the user 101 to monitor the user 101 in the activity environment 105 for activities, movements, and speech, by the monitoring devices 110, in order to facilitate the cognitive communication channel adaptation service, and access the user device 103 to provide converted communication content via an optimal communication channel as offered by the cognitive communication channel adaptation service.

Few examples of the cognitive communication channel adaptation services as provided by the cognitive communication channel adaptation system 120 includes, but are not limited to: displaying lyrics of songs played at a concert for the user 101 on the user device 103 by use of a speech-to-text service for a hearing impaired user 101, when the user 101 who does not have a line of sight to a screen at the concert on which a sign language interpreter is presenting the songs, concurrently as the rate of songs being played at the concert in real time; converting audio message of an incoming phone call to a sign language in real time for a hearing impaired user who knows the sign language; converting audio messages exchanges in a teleconference to text subtitles with respective speaker identities and recording the script for a user who wishes to keep a documented record of the teleconference.

Certain embodiments of the present invention can be offered to telecommunication service providers and their subscribers in order to ensure the best quality of the communication content delivery in a user-preferred manner in dynamic environments with various interferences. Also certain group of users with difficulty in communication with a certain medium/channel, the cognitive communication channel adaptation service that converts communication contents in one channel with which the user has difficulty using to another channel with which the user can communicate without difficulty would be of great value to users with communication capability issues with a particular medium as significantly improving the quality of life of the for the users.

Figure 2:
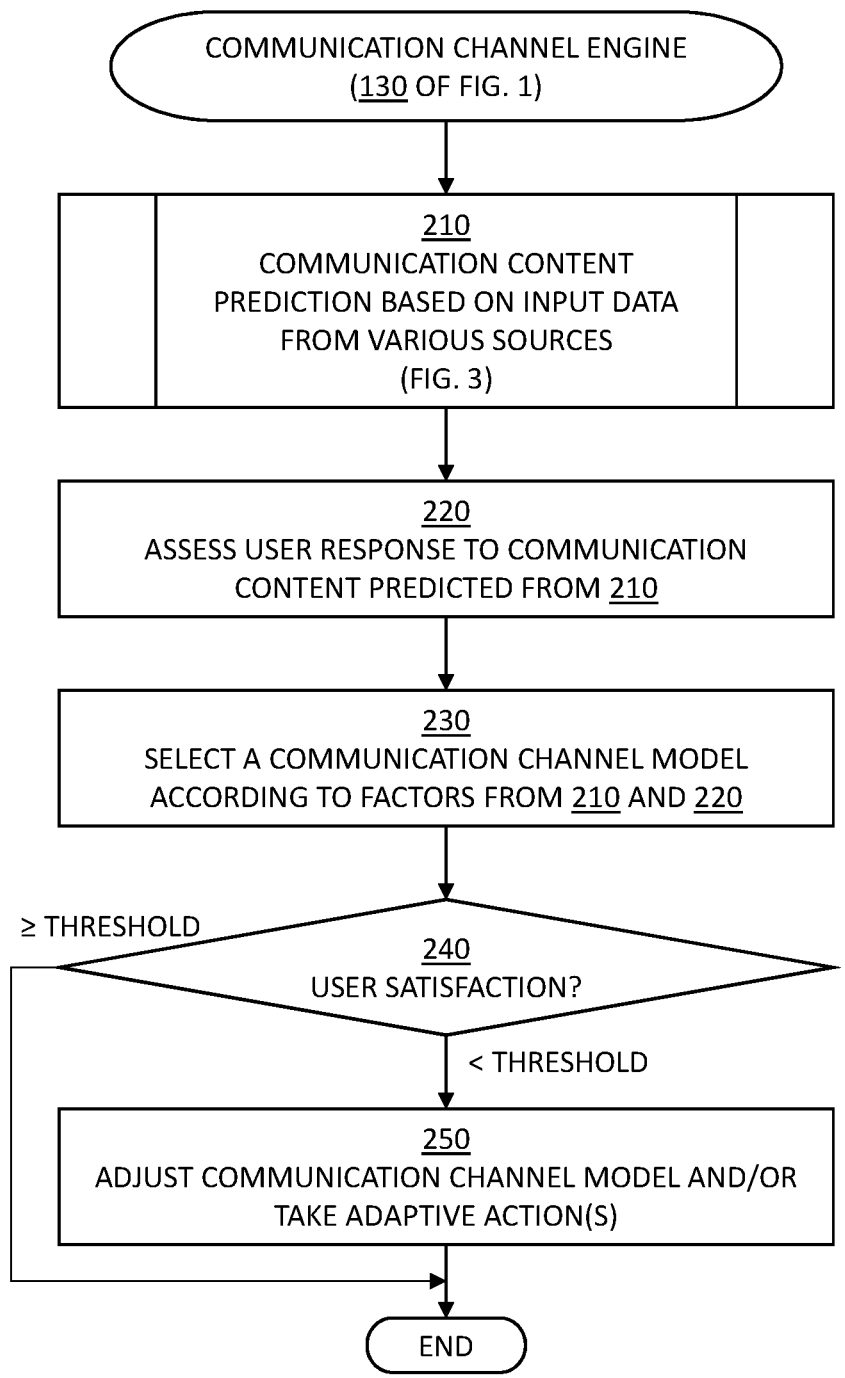
FIG. 2 depicts a flowchart of operations performed by the communication channel engine, in accordance with one or more embodiments set forth herein.

FIG. 2 depicts a flowchart of operations performed by the communication channel engine 130, in accordance with one or more embodiments set forth herein.

In block 210, the communication channel engine 130 predicts an upcoming communication content on a current communication channel by which the communication content is being delivered based on input data according to a context of a current activity in which the current communication is taking place. The communication channel engine 130 obtains various input data including the activity environment 105, the user profile 160, and the cloud database 190. The communication channel engine 130 parallelly operates a plurality of machine learning tools on respective input data in block 210. Detailed operations of the communication channel engine 130 in block 210 are presented in FIG. 3 and corresponding description. Then, the communication channel engine 130 proceeds with block 220.

In certain embodiments of the present invention, the communication channel engine 130 obtains the input data from the activity environment 105 as monitored by the monitoring device 110, the user activity and environment data 119, the user profiles 160, and the cloud database 190. The communication channel engine 130 concurrently processes predefined groups of input data from the respective sources 119, 160, 190, by distinctive machine learning tools, and predicts the content the user 101 is about to communicate, either by sending or receiving, with a counterpart in the communication.

In the same embodiments of the present invention, the communication channel engine 130 also predicts a cognitive state of the user 101 at the time for which the prediction for the communication content is made. Based on a weighted combination of the predicted communication content, the predicted cognitive state of the user 101, communication capabilities of the user 101, as provided in the user profile 160 and/or monitored from the activity environment 105, and an optional priority of the communication activity of the user 101 indicating how important the current communication activity is for the user 101, the communication channel engine 130 selects one of the communication channel models 140. The priority of the communication activity is applicable on certain types of communication instances, but not all activities. The cognitive communication channel adaptation system 120 can have the preconfigured priorities corresponding to respective communication activities represented in the communication channel models 140, and/or stored in the cloud database 190.

In block 220, the communication channel engine 130 assesses a response of the user 101 to the upcoming communication content as predicted in block 210 on the current communication channel by which the communication content would be delivered. The communication channel 130 assesses the response of the user 101 in terms of a cognitive state of the user 101 in receiving or sending the predicted communication content and a level of satisfaction for the user 101 with the current communication channel, based on the communication capabilities of the user 101 as recorded in the user profile 160, and any interfering factors in the activity environment 105 with the communication capabilities of the user 101, as included in the input data from block 210. Then, the communication channel engine 130 proceeds with block 230.

In certain embodiments of the present invention, the communication channel engine 130 utilizes the cognitive analytics tool 180 in assessing the user response to the predicted communication content in block 220. The user response is predicted primarily based on whether or not the predicted communication content would be successfully communicated to the user 101 over the current communication channel, and the cognitive state of the user 101 would be positive toward the communication channel, based on communication capabilities of the user 101 and circumstantial factors in the activity environment 105. For example, the predicted communication content would be highly prioritized as one of the participant in a phone conversation indicated as such and background noise gets louder in the activity environment 105 for the user 101, the communication channel engine 130 predicts that the user 101 would negatively respond to being not able to hear the predicted communication content due to the background noise.

In block 230, the communication channel engine 130 selects one of the communication channel models 140 that features a communication channel that is applicable for a current activity of the user 101, specifically features communication channels that suits best for the communication content predicted from block 210, based on the predicted communication content, the user response including the cognitive state of the user 101, the communication capabilities of the user 101, and any interfering factors in the activity environment 105 as assessed from block 220. Then, the communication channel engine 130 proceeds with block 240.

In certain embodiments of the present invention, the communication channel engine 130, the communication channel engine 130 performs the Principal Component Analysis (PCA) on the result from block 220, in order to reduce dimensionality of features affecting the selection of the communication channel model 140, prior to select the communication channel model 140. In one embodiment of the present invention, the communication channel engine 130 begins eliminating a parameter or decreasing the weight of the parameter, from the parameters having the least effect on the cognitive state of the user 101, and keeps reducing parameters until a preconfigured number of parameters are eliminated or until a certain number of primary parameters are left.

In block 240, the communication channel engine 130 determines whether or not the user satisfaction level with the current communication channel in the communication channel model 140 selected from block 230 meets a predefined threshold for user satisfaction with communication channels in the cognitive communication adaptation service. The communication channel engine 130 determines the user satisfaction level by monitoring the user 101 while the user 101 continues the current activity, or by assessing as an element of the user response in block 220. If the communication channel engine 130 determines that the user satisfaction level meets the threshold, then, the communication channel engine 130 loops back to block 210 to continue monitoring the communication while maintaining the current communication channel for the user 101 in performing the current activity. If the communication channel engine 130 determines that the user satisfaction level does not meet the threshold, then the communication channel engine 130 proceeds with block 250.

In certain embodiments of the present invention, the communication channel engine 130 applies distinctive values for the user satisfaction level, respective to priorities of the current activity and/or the priorities of the communication content. The communication channel engine 130 evaluates the priority of the user activity and/or the communication content based on customized priority scale for the user 101 as stored in the user profile 160. In other embodiments of the present invention, the communication channel engine 130 dynamically evaluates the priority of the user activity and/or the communication content based on the monitored user activity data, environmental factors, the communication capabilities of the user 101, and communication history of the user 101 as stored in the cloud database 190.

In block 250, the communication channel engine 130 takes one of the adaptive action 150 corresponding to the communication channel model 140, such that the user 101 continues the current activity while communicating over a more effective communication channel as specified in the adaptive action 150. Then, the communication channel engine 130 loops back to block 210 to continue monitoring the activity of the user 101 communicating over the communication channel as adjusted by the adaptive action 150 in block 250.

In the example presented under block 220 where the communication channel engine 130 predicted that the user 101 would negatively respond to being not able to hear the predicted communication content of a high priority due to the background noise, the communication channel engine 130 can take an adaptive action of amplifying the volume while playing the incoming voice data for the user 101 in the noisy activity environment 105, and canceling noise for outgoing voice data for the other user. In the same example, the communication channel engine 130 can take another adaptive action of displaying text for the incoming voice data to the user 101 on the user device 103 such that the user 101 receives the message from the other user intact without being disturbed by the background noise.

In certain embodiments of the present invention, the communication channel engine 130, based on the discovered signs on troubles with a current communication channel, selects one of the communication channel model 140 that supports or substitutes the current channel with which the user 101 is having trouble in subsequent process. The communication channel engine 130 takes an adaptive action 150 such as, for example, adding a visual channel with additional text/subtitle for the incoming audio, by use of a speech-to-text tool available for the user device 103, or redirecting the incoming audio speech to a text application on the user device 103. The communication channel engine 130 stores signal words and phrases indicating troubles with a communication channel in the cloud database 190 for future analyses.

Figure 3:
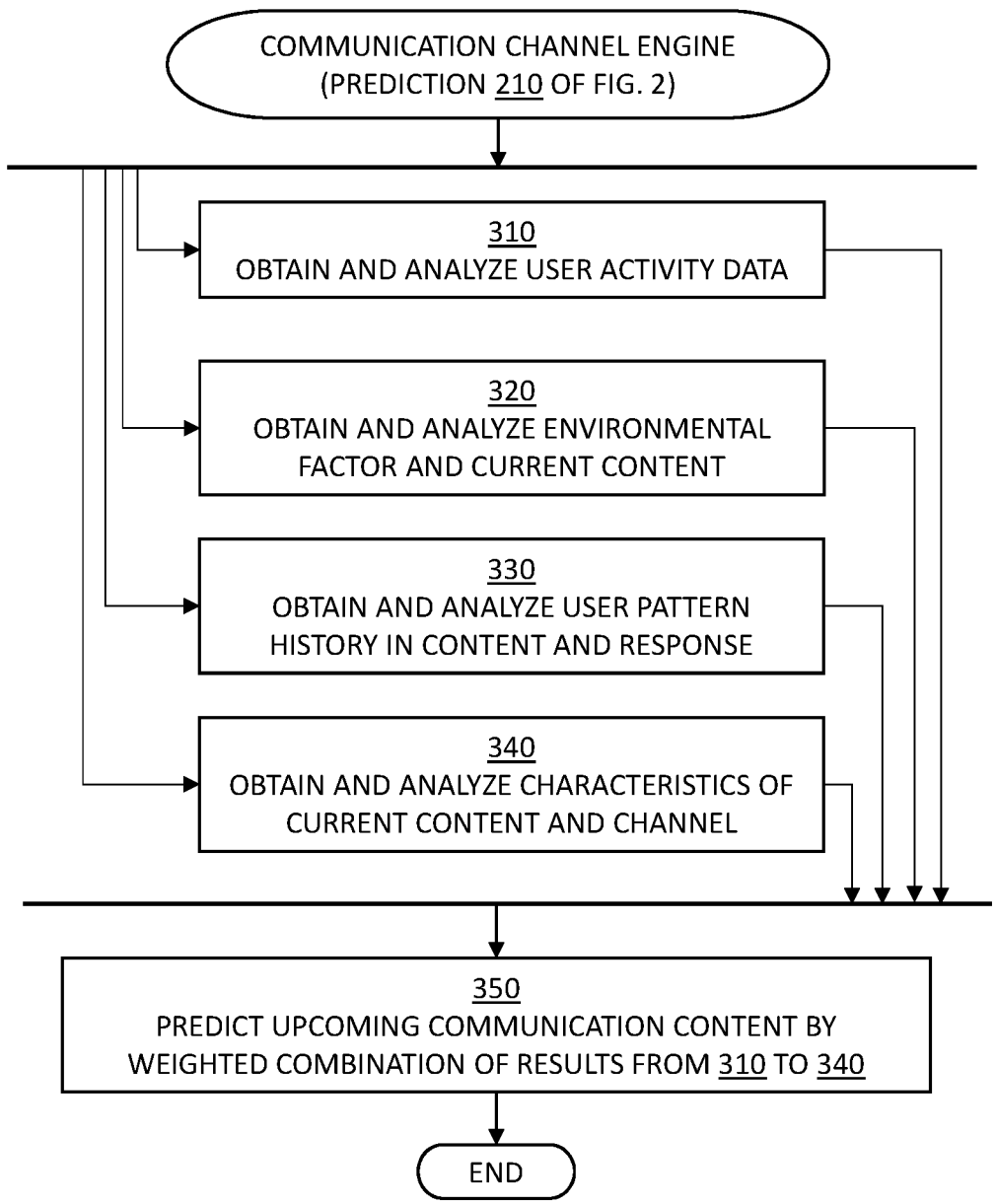
FIG. 3 depicts a flowchart for predicting upcoming content in the communication as performed in block 210 of FIG. 2 by the communication channel engine, in accordance with one or more embodiments set forth herein.

FIG. 3 depicts a flowchart for predicting upcoming content in the communication as performed in block 210 of FIG. 2 by the communication channel engine 130, in accordance with one or more embodiments set forth herein.

Blocks 310, 320, 330, and 340 are performed concurrently by respective threads of the communication channel engine 130. Respective threads can be coupled to respective machine learning model for the communication channel engine 130, such that the respective input data items would be utilizes to train the respective machine learning models. The communication channel engine 130 also utilizes a distinctive machine learning model to train the communication channel model 140 based on combinations of the respective input data items, in making prediction on the upcoming communication content.

In block 310, the communication channel engine 130 obtains and analyzes data on the current activity of the user 101 based on the user profile 160 by use of a machine learning tool 170. The communication channel engine 130 identifies the user 101 by login credentials, personal devices and/or any identifying signature for the user 101 registered in the user profile, or by voice analysis and speaker identification models. The communication channel engine 130 stores the analyzed activity data in the cloud database 190 to train the machine learning tool for future analyses. Then, the communication channel engine 130 proceeds with block 350.

The communication channel engine 130 accesses the user profile 160 of the identified user 101. The communication channel engine 130 identifies all participants of the current activity, communicating with one another, and determines a relationship between the participants in order to determine a priority of the current activity/communication. As noted, the user profile 160 describes cognitive abilities and sensory perceptiveness of the user 101 that affect communication capabilities of the user 101 over respective medium/channels, including, but are not limited to, an audio channel, a video channel, a text channel, a sign language channel, etc.

The communication channel engine 130 analyzes input data on the current activity of the user 101 based on the information available from the user profile 160. The communication channel engine 130, for example, monitors the communication content for the current activity of the user 101 is a phone conversation, and detects certain keywords on schedules and events from a calendar of the user 101 for content prediction with respect to the topic of the conversation, and/or certain predefined signs of trouble with the communication in the current activity for the user 101.

In certain embodiments of the present invention, the communication channel engine 130 looks particularly for signs with the current communication channel for the user 101 in the current activity. The cognitive communication channel adaptation system 120 further cumulates input data over time and stores the user 101 indicating a trouble with the current communication channel as an audio channel with a microphone and a speaker. Examples of comments indicating any trouble with the audio channel include, but are not limited to, "What did you say? You're mumbling.", "Come again?", "Could you repeat that please", "Say again?", "Sorry, I couldn't hear what you just said. It's loud here", "Can't hear you", "I beg your pardon", or the like. The communication channel engine 130 stores the sign words and phrases indicating troubles with the communication channel in the cloud database 190 for future analyses.

In block 320, the communication channel engine 130 obtains and analyzes data on the activity environment 105 by use of a machine learning tool 170. The communication channel engine 130 stores the analyzed environment data in the cloud database 190 to train the machine learning tool for future analyses. Then, the communication channel engine 130 proceeds with block 350.

The activity environment 105 is equipped with a plurality of monitoring devices 110 such as cameras, microphones, and/or beacons, and any personal devices participating in the monitoring for the cognitive communication channel adaptation system 120. The monitoring devices 110 communicates with the cognitive communication channel adaptation system 120 by a wired/wireless networks such as personal area networks (PANs), near field communication (NFC), pico-nets, or any type of ad hoc networks coupling the monitoring devices 110 to the cognitive communication channel adaptation system 120. In certain embodiments of the present invention, any devices with a certain capability within a certain proximity to the user device 103 can be used as the monitoring devices 110 with appropriate informed consent by respective users of the devices.

The activity environment 105 indicates a geospatial surroundings of the activity currently performed by the user 101, and based on the respective perception of the user 101 the range of the activity environment 105 can be specified individually for each user. The communication channel engine 130 particularly identifies any circumstantial factors from the activity environment 105 that can affect the current activity of the user 101. For example, the communication channel engine 130 checks a noise level in the activity environment 105 when the user 101 is communicating on the phone with another user in a voice channel, because a certain level of noise can be disruptive for the phone conversation over the voice channel.

In block 330, the communication channel engine 130 obtains, from the cloud database 190, communication history data and analyzes for a pattern of exchanges in past communications similar to the current activity, by use of a machine learning tool 170. The communication channel engine 130 stores the analyzed historical pattern data in the cloud database 190 to train the machine learning tool for future analyses. Then, the communication channel engine 130 proceeds with block 350.

In certain embodiments of the present invention, the communication channel engine 130 stores the communication history data per user, and analyzes an individual patterns in communication per content, per channel, in the cloud database 190. When the number of communication history data instances generated by an individual user is not enough to recognize a pattern, the communication channel engine 130 can utilize a group pattern based on similar communication capabilities, similar demographic characteristics, similar occupation, similar locality, and combinations thereof, in order to identify and to apply any similarity with social behavior with communications. For example, if the user 101 is a teenager who uses certain social media application frequently, the communication channel engine 130 would use a historical pattern of communication applicable for the teenager-social media user, rather than any other demographic-social behavior group. Particularly, the pattern of exchange by a group having similar communication capabilities and limitations as the user 101 would be useful in detecting and remedying any trouble with the communication channel, where the predicted communication content would be substantially similar.

In block 340, the communication channel engine 130 obtains and analyzes characteristics of currently communicated content and the current channel by use of a machine learning tool 170. The communication channel engine 130 stores the analyzed characteristics of the content and the channel in the communication channel model 140 future uses. Then, the communication channel engine 130 proceeds with block 350.

In certain embodiments of the present invention, the communication channel engine 130 uses a preconfigured set of available channels that are supported by the cognitive communication channel adaptation system 120. The communication channel engine 130 also classifies ongoing communication content and associates a certain high priority communication such as a business teleconference and an emergency call with a channel most preferred by the user 101 and/or with an supplemental channel to ensure seamless communication such as added captions for voice messages exchanges in the business conference, or an automatic video recording and transfer in addition to the voice messages for the emergency call.

In block 350, the communication channel engine 130 predicts an upcoming communication content on the current channel by combining the results from blocks 310, 320, 330, and 340, based on respective preconfigured weights. The communication channel engine 130 utilizes a machine learning tool 170 and the cognitive analytics tool 180 in making the prediction, for example, by use of a context analysis on the weighted input data. Then, the communication channel engine 130 proceeds with block 220 of FIG. 2.

In certain embodiments of the present invention, the communication channel engine 130 has a set of preconfigured weights as 0.2 for the user activity data from block 310, 0.3 for the environment data from block 320, 0.2 for the pattern history data, and 0.3 for the content and channel characteristics. The communication channel engine 130 combines the input data from blocks 310, 320, 330, and 330, according to the respective weights as specified above to make prediction on the upcoming communication content on the current channel as the user 101 conducts the current activity.

In certain embodiments of the present invention, the communication channel engine 130 has a customized set of weights per input data type based on the identity of the user 101 as provided in the user profile 160. For example, the communication channel engine 130 would weigh a communication pattern more heavily if the user 101 had held a lot of similar activities in the past and have a clear pattern of communication than another user 101 who does not have a distinctive pattern of communication. Accordingly, the communication channel engine 130 would weigh pattern data more for the user with the distinctive pattern of communication, while weigh presently monitored data more for the user who is without, in predicting the upcoming communication content.

In certain embodiments of the present invention, the communication channel engine 130 has a customized set of weights per input data type based on the individual user preference and/or communication capability, as provided in the user profile 160. For example, if the user profile 160 indicates that the user 101 cannot see very well at night, then the communication channel engine 160 would weigh an activity of nighttime driving heavily in order to ensure that the user 101 would get navigational assistances with voice guidance and a warning voice message for any dimly lit area to which the user is approaching along a route.

Figure 4:
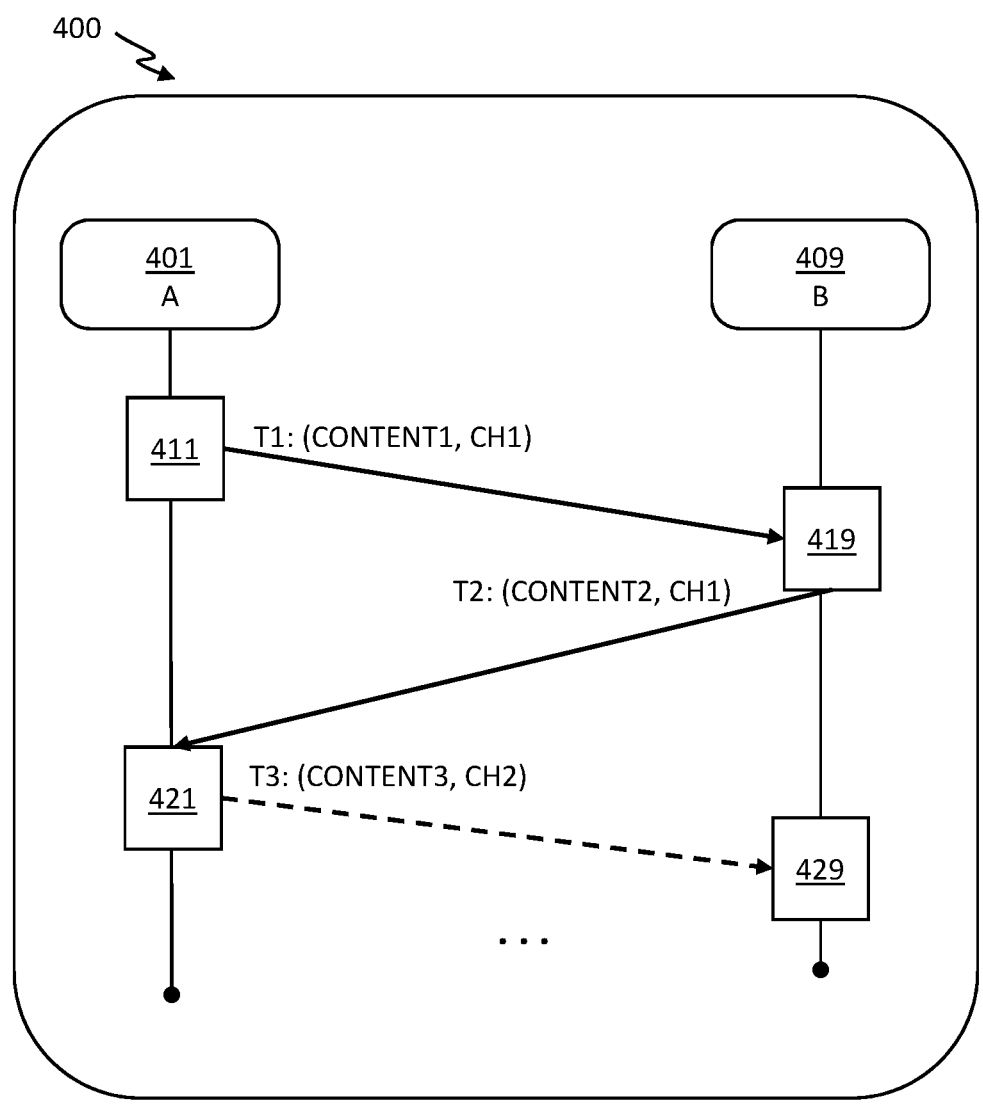
FIG. 4 depicts an exemplary communication process in the context of the cognitive communication channel adaptation service, in accordance with one or more embodiments set forth herein.

FIG. 4 depicts an exemplary communication process 400 in the context of the cognitive communication channel adaptation service, in accordance with one or more embodiments set forth herein.

In a first use scenario, Participant B 409 is an individual who is hearing impaired, can read lips to conduct conversation, and also knows a sign language. Participant B 409 also carries a smart glasses in order to access the cognitive communication channel adaptation service while communicating with Participant A 401, another individual, in person. The cognitive communication channel adaptation system 120 collects: a first input data 411 indicating Participant A 401 is speaking at time T1, with Content1 over channel CH1, which is an audio message; and a second input data 419 at time T2 by Participant B 409 telling Participant A 401 that he did not get Content1 as he cannot hear well and will try to read lips of Participant A 401, which is Content2. The cognitive communication channel adaptation system 120 predicts that, in next action 421, Participant A 401 would respond with Content3 at time T3 by talking, and converts the speech with Content3 by Participant A 401 to a sign language equivalent of Content3, where channel CH2 is the sign language display on the smart glasses of Participant B 409. Participant B 409 receives Content3 message in sign language properly as a result in action/state 429.

In a second use scenario, Participant B 409 is an individual who is watching a news on a television set in a noisy living room in her home. Participant A 401 is a broadcasting company airing a news program. At time T1, in action 411, the news Content1 is delivered over an audio-visual channel CH1 with a live image of an event. The cognitive communication channel adaptation system 120 monitors facial expression of Participant B 409 and determines that, in state 419, Participant B 409 had not received the news Content1. The cognitive communication channel adaptation system 120, based on the inputs from the activity environment, determines that the background noise interferes with the sound of the television. The cognitive communication channel adaptation system 120 subsequently turns on caption text of the news program at time T3 for the delivery of Content3 such that the background noise would be overcome. The adapted channel CH2 is a combination of audio-visual channel and the text display from the television set. Accordingly, at state 429, Participant B 409 receives the news Content3 properly.

In a third scenario, Participant A 401 and Participant B 409 are both individual user who are enjoying an outdoor activity in a cold winter day. Participant B 409 is wearing a smart hat with an embedded headset. At action 411, Participant A 401 tells Content1 to Participant B 409 in person. At action/state 419, Participant B 409 notices that Participant A 401 said something to him but could not understand because his ears are all covered with the hat and a scarf, and says "what did you say?" which is Content2. The cognitive communication channel adaptation system 120, based on the inputs from the activity environment including temperature, determines that Participant B 409 is temporarily experiencing hearing impairment and turns on the headset of the smart hat on Participant B 409. At action 421, Participant A says Content3, and the cognitive communication channel adaptation system 120 captures the audio message Content3 and plays Content3 to the headset and for Participant B 409. At action/state 429, Participant B 409 receives Content3 properly and continues with the communication.

Certain embodiments of the present invention provides the cognitive communication channel adaptation service based on various artificial intelligence technology including machine learning, cognitive analytics, and natural language processing. Certain embodiments of the present invention provides the channel adaptation service by gathering data from all aspects of communication from the user capability, communication pattern history, environmental interferences, and characteristics of the communication, and building a communication channel model and correlating adaptive actions based on the context of the communication in its entirety. Certain embodiments of the present invention provides the cognitive communication channel adaptation service that converts communication contents in one channel with which the user has difficulty using to another channel with which the user can communicate without difficulty would be of great value to users with communication capability issues with a particular medium/channel as significantly improving the quality of life of the for the users. Certain embodiments of the present invention can be offered to telecommunication service providers and their subscribers in order to ensure the best quality of the communication content delivery in a user-preferred manner in dynamic environments with various interferences. Certain embodiments of the present invention can be implemented by use of a cloud platform/data center in various types including a Software-as-a-Service (SaaS), Platform-as-a-Service (PaaS), Database-as-a-Service (DBaaS), and combinations thereof based on types of subscription.

Figure 5:
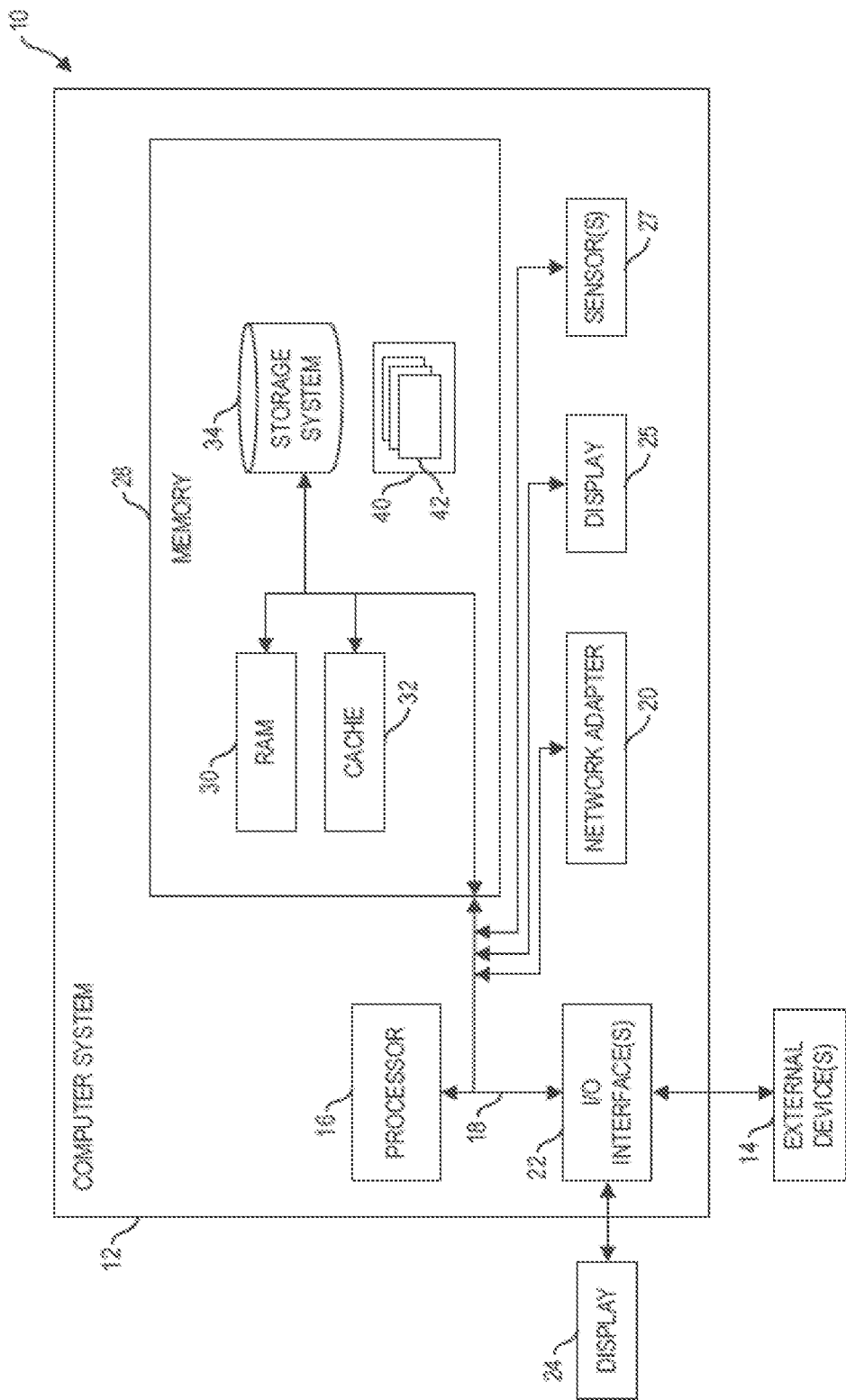
FIG. 5 depicts a cloud computing node according to an embodiment of the present invention.
Figure 6:
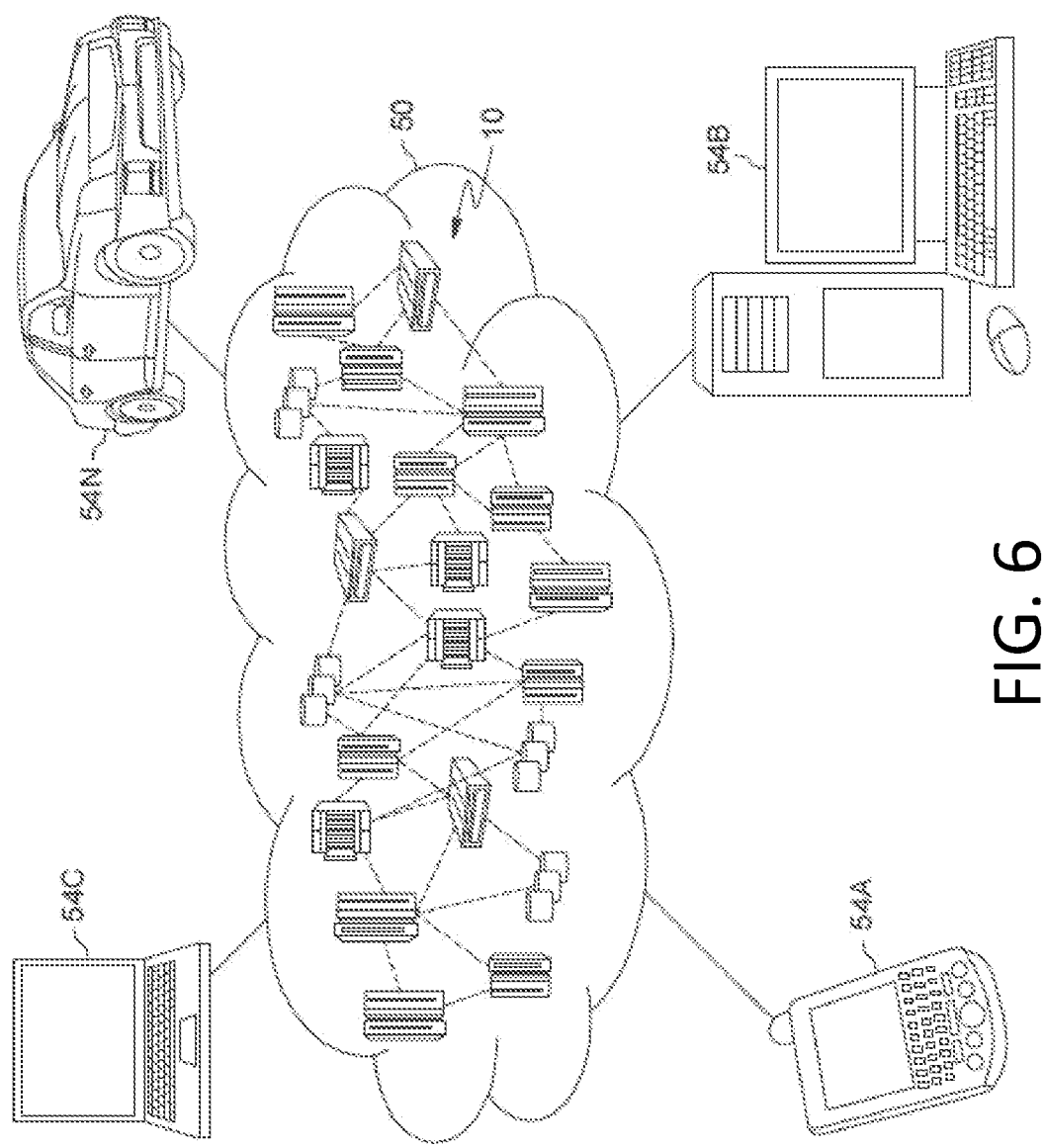
FIG. 6 depicts a cloud computing environment according to an embodiment of the present invention.
Figure 7:
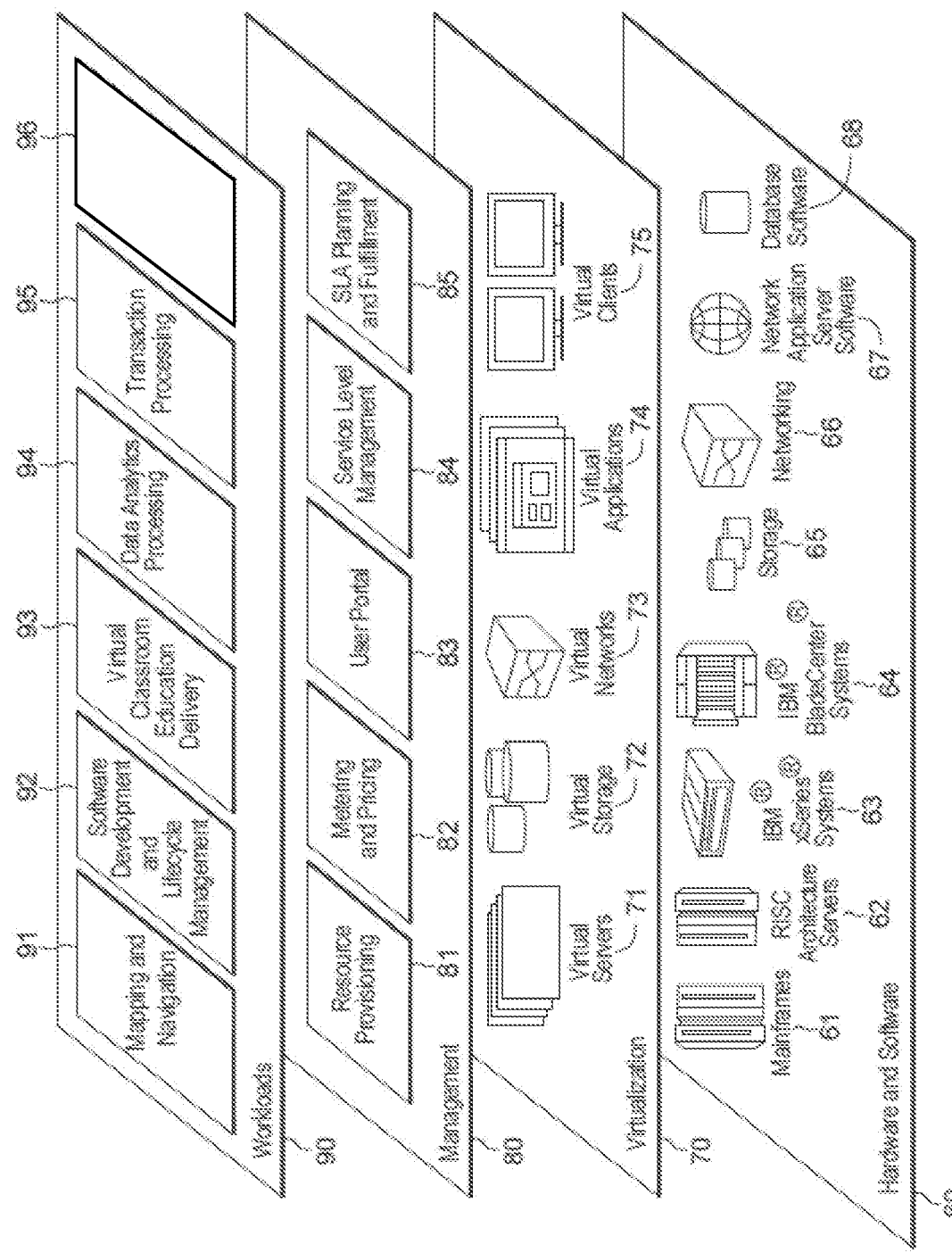
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive communication channel adaptation system 120 and the communication channel engine 130 of FIG. 1, respectively. Program processes 42, as in the communication channel engine 130, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive communication channel adaptation services as provided by the cognitive communication channel adaptation 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    predicting, by one or more processor, an upcoming communication content in a current channel based on learning input data from a plurality of sources relevant to a communication activity of a user, wherein the upcoming communication content is generated by the communication activity of the user;
    assessing, by the one or more processor, a response of the user to the upcoming communication content from the predicting;
    selecting, by the one or more processor, one of communication channel models based on factors including the upcoming communication content from the predicting and the response of the user from the assessing;
    ascertaining, by the one or more processor, that user satisfaction level with the upcoming communication content in the current channel expressed in the response does not meet a predefined threshold for user satisfaction in the communication channel model from the selecting; and
    adapting, by the one or more processor, the upcoming communication content in the current channel to another channel by performing an adaptive action corresponding to the communication channel model, wherein the user continues the communication activity by use of the another channel subsequent to the adapting, the predicting comprising:
        gathering, from respective sources amongst the plurality of the sources, the input data including, a user profile describing communication capabilities of the user, parameters describing an environment of the communication activity, communication pattern history of the user, and contents being presently and previously communicated in the communication activity; and
        producing the upcoming communication content by combining the input data from the gathering according to respective weights corresponding to each item of the input data.

2. The computer implemented method of claim 1, further comprising:
    ascertaining that the user has any restriction with the communication capabilities and that the current channel is one of communication channels that the user is restricted with the communication capabilities; and
    ensuring the adaptive action for the user to adapt the current channel with the another channel, wherein the another channel is not one of communication channels that the user is restricted with the communication capabilities.

3. The computer implemented method of claim 1, wherein the communication activity is prioritized based on a significance of the upcoming communication content from the predicting.

4. The computer implemented method of claim 1, the ascertaining comprising:
identifying one of signal expressions indicating a trouble with the current channel expressed in the response by the user, wherein the signal expressions are stored in a cloud database as gathered from the input data.

5. The computer implemented method of claim 1, wherein the communication channel models are built by use of support vector machine learning technique.

6. The computer implemented method of claim 1, wherein the adaptive action is selected from the group consisting of: replacing the current channel from audio medium to visual medium including subtitle and sign language; adding caption text to the current channel with visual medium; switching play audio/voice message on loudspeakers to a headset; amplifying quality of messages on audio/visual medium and delivering to a personal device of the user in real time; storing messages on audio/visual medium and delivering to the personal device of the user at later time based on communication network availability.

7. The computer implemented method of claim 1, wherein the adaptive action includes adding caption text to the current channel with visual medium.

8. The computer implemented method of claim 1, wherein the adaptive action includes switching play audio/voice message on loudspeakers to a headset.

9. The computer implemented method of claim 1, wherein the adaptive action includes amplifying quality of messages on audio/visual medium and delivering to a personal device of the user in real time.

10. A computer program product comprising:
a computer readable storage medium readable by one or more processor and storing instructions for execution by the one or more processor for performing a method comprising:
predicting an upcoming communication content in a current channel based on learning input data from a plurality of sources relevant to a communication activity of a user, wherein the upcoming communication content is generated by the communication activity of the user;
assessing a response of the user to the upcoming communication content from the predicting;
selecting one of communication channel models based on factors including the upcoming communication content from the predicting and the response of the user from the assessing;
ascertaining that user satisfaction level with the upcoming communication content in the current channel expressed in the response does not meet a predefined threshold for user satisfaction in the communication channel model from the selecting; and
adapting the upcoming communication content in the current channel to another channel by performing an adaptive action corresponding to the communication channel model, wherein the user continues the communication activity by use of the another channel subsequent to the adapting, the predicting comprising:
gathering, from respective sources amongst the plurality of the sources, the input data including, a user profile describing communication capabilities of the user, parameters describing an environment of the communication activity, communication pattern history of the user, and contents being presently and previously communicated in the communication activity; and
producing the upcoming communication content by combining the input data from the gathering according to respective weights corresponding to each item of the input data.

11. The computer program product of claim 10, further comprising:
ascertaining that the user has any restriction with the communication capabilities and that the current channel is one of communication channels that the user is restricted with the communication capabilities; and
ensuring the adaptive action for the user to adapt the current channel with the another channel, wherein the another channel is not one of communication channels that the user is restricted with the communication capabilities.

12. The computer program product of claim 10, wherein the communication activity is prioritized based on a significance of the upcoming communication content from the predicting.

13. The computer program product of claim 10, the ascertaining comprising:
identifying one of signal expressions indicating a trouble with the current channel from the user response, wherein the signal expressions are stored in a cloud database as gathered from the input data.

14. The computer program product of claim 10, wherein the communication channel models are built by use of support vector machine learning technique.

15. The computer program product of claim 10, wherein the adaptive action is selected from the group consisting of: replacing the current channel from audio medium to visual medium; adding caption text to the current channel with visual medium; replacing the current channel from voice messages to respective sign language equivalents; switching play audio/voice message on loudspeakers to a headset; amplifying quality of messages on audio/visual medium and delivering to a personal device of the user in real time; storing messages on audio/visual medium and delivering to the personal device of the user at later time based on communication network availability.

16. The computer program product of claim 10, the selecting comprising:
predicting a cognitive state of the user upon receiving the upcoming communication content in the current channel;
applying weights respectively configured for the factors further including the cognitive state of the user during the response, communication capabilities of the user per predefined medium as specified in a user profile in the input data, temporary communication capabilities of the user as monitored from an environment of the communication activity, a priority of the communication activity of the user indicating how important the communication activity is for the user; and
electing a communication channel model corresponding to a result from the applying amongst the communication channel models, wherein each of the communication channel models specifies respective communication channels based on specific communication activities of users of varying communication capabilities and corresponds to one or more adaptive action on the respective communication channels.

17. The computer program product of claim 10, further comprising:
performing a Principal Component Analysis (PCA) on a result from the assessing, subsequent to the assessing, based on preconfigured rules with respect to the weights and a number of the factors, to thereby reduce a dimensionality of the factors considered in an applying,
wherein the selecting comprises:
predicting a cognitive state of the user upon receiving the upcoming communication content in the current channel;
applying weights respectively configured for the factors further including the cognitive state of the user during the response, communication capabilities of the user per predefined medium as specified in a user profile in the input data, temporary communication capabilities of the user as monitored from an environment of the communication activity, a priority of the communication activity of the user indicating how important the communication activity is for the user; and
electing a communication channel model corresponding to a result from the applying amongst the communication channel models, wherein each of the communication channel models specifies respective communication channels based on specific communication activities of users of varying communication capabilities and corresponds to one or more adaptive action on the respective communication channels.

18. The computer program product of claim 10, the assessing comprising:
determining a cognitive state of the user and a level of satisfaction with the current channel by the user in receiving or sending the upcoming communication content from the predicting via the current channel, based on communication capabilities of the user and any element interfering the communication activity in an environment of the communication activity with respect to the communication capabilities of the user, wherein the communication capabilities of the user is recorded in a user profile of the user, wherein the input data includes the user profile.

19. A system comprising:
a memory;
one or more processor in communication with the memory; and
program instructions executable by the one or more processor via the memory to perform a method comprising:
predicting an upcoming communication content in a current channel based on learning input data from a plurality of sources relevant to a communication activity of a user, wherein the upcoming communication content is generated by the communication activity of the user;
assessing a response of the user to the upcoming communication content from the predicting;
selecting one of communication channel models based on factors including the upcoming communication content from the predicting and the response of the user from the assessing;
ascertaining that user satisfaction level with the upcoming communication content in the current channel expressed in the response does not meet a predefined threshold for user satisfaction in the communication channel model from the selecting; and
adapting the upcoming communication content in the current channel to another channel by performing an adaptive action corresponding to the communication channel model, wherein the user continues the communication activity by use of the another channel subsequent to the adapting, the predicting comprising:
gathering, from respective sources amongst the plurality of the sources, the input data including, a user profile describing communication capabilities of the user, parameters describing an environment of the communication activity, communication pattern history of the user, and contents being presently and previously communicated in the communication activity; and
producing the upcoming communication content by combining the input data from the gathering according to respective weights corresponding to each item of the input data.

20. The system of claim 19, further comprising:
ascertaining that the user has any restriction with the communication capabilities and that the current channel is one of communication channels that the user is restricted with the communication capabilities; and
ensuring the adaptive action for the user to adapt the current channel with the another channel, wherein the another channel is not one of communication channels that the user is restricted with the communication capabilities.

* * * * *